(12) United States Patent
Nakaya

(10) Patent No.: US 10,452,159 B2
(45) Date of Patent: Oct. 22, 2019

(54) TILT DERIVATION DEVICE AND METHOD

(71) Applicant: LG DISPLAY CO., LTD., Seoul (KR)

(72) Inventor: Hideo Nakaya, Tokyo (JP)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 15/889,779

(22) Filed: Feb. 6, 2018

(65) Prior Publication Data
US 2018/0224952 A1 Aug. 9, 2018

(30) Foreign Application Priority Data

Feb. 6, 2017 (JP) .................................. 2017-019289

(51) Int. Cl.
G06F 3/0346 (2013.01)
G06F 3/038 (2013.01)
G06F 3/0354 (2013.01)

(52) U.S. Cl.
CPC ............ G06F 3/0346 (2013.01); G06F 3/038 (2013.01); G06F 3/0383 (2013.01); G06F 3/03545 (2013.01)

(58) Field of Classification Search
CPC .... G06F 3/0346; G06F 3/03545; G06F 3/038; G06F 3/0383
USPC ....................................................... 345/179
See application file for complete search history.

(56) References Cited

U.S. PATENT DOCUMENTS

2013/0082976 A1* 4/2013 Kang .................... G06F 3/0488
345/174
2017/0255331 A1* 9/2017 Yeh ........................ G06F 3/0416
2017/0262071 A1* 9/2017 Chang .................... G06F 3/0383

FOREIGN PATENT DOCUMENTS

JP 2011-164801 A 8/2011
JP 2016-126503 A 7/2016
KR 10-2000-0067478 A 11/2000
KR 10-2011-0091459 A 8/2011

* cited by examiner

Primary Examiner — Jennifer Mehmood
Assistant Examiner — Ngan T Pham Lu
(74) Attorney, Agent, or Firm — Birch, Stewart, Kolasch & Birch, LLP

(57) ABSTRACT

A tilt derivation device and method for deriving a tilt of a pointer, are discussed. The pointer includes a first electrode at one end of an axis and a second electrode around the axis. The tilt derivation device includes a sensor of a plane shape configured to detect positions of the first and second electrodes; and a control portion including a lookup table in which a correspondence relationship between a tentative value of a slope direction tilt and a compensation value is registered, wherein the slope direction tilt is a tilt of the axis toward a slope direction that the axis is inclined from a normal direction perpendicular to the sensor, a slope direction tilt calculation portion calculating the tentative value based on the positions of the first and second electrodes and inputting the tentative value into the lookup table, and a tilt derivation portion deriving the tilt from the compensation value outputted from the lookup table.

20 Claims, 11 Drawing Sheets

| D1<br>(-2, -2) | D2<br>(-2, -1) | D3<br>(-2, 0) | D4<br>(-2, 1) | D5<br>(-2, 2) |
|---|---|---|---|---|
| D6<br>(-1, -2) | D7<br>(-1, -1) | D8<br>(-1, 0) | D9<br>(-1, 1) | D10<br>(-1, 2) |
| D11<br>(0, -2) | D12<br>(0, -1) | D13<br>(0, 0) | D14<br>(0, 1) | D15<br>(0, 2) |
| D16<br>(1, -2) | D17<br>(1, -1) | D18<br>(1, 0) | D19<br>(1, 1) | D20<br>(1, 2) |
| D21<br>(2, -2) | D22<br>(2, -1) | D23<br>(2, 0) | D24<br>(2, 1) | D25<br>(2, 2) |

FIG. 4

| Address | Data | Address | Data | Address | Data | Address | Data | Address | Data |
|---|---|---|---|---|---|---|---|---|---|
| 0 | 0 | 16 | 16 | 32 | 25 | 48 | 47 | 64 | 65 | 80 | 65 |
| 1 | 3 | 17 | 17 | 33 | 26 | 49 | 48 | 65 | 65 | 81 | 65 |
| 2 | 5 | 18 | 17 | 34 | 27 | 50 | 50 | 66 | 65 | 82 | 65 |
| 3 | 6 | 19 | 18 | 35 | 28 | 51 | 52 | 67 | 65 | 83 | 65 |
| 4 | 8 | 20 | 19 | 36 | 29 | 52 | 54 | 68 | 65 | 84 | 65 |
| 5 | 9 | 21 | 19 | 37 | 30 | 53 | 56 | 69 | 65 | 85 | 65 |
| 6 | 10 | 22 | 20 | 38 | 31 | 54 | 58 | 70 | 65 | 86 | 65 |
| 7 | 11 | 23 | 20 | 39 | 32 | 55 | 61 | 71 | 65 | 87 | 65 |
| 8 | 12 | 24 | 21 | 40 | 33 | 56 | 64 | 72 | 65 | 88 | 65 |
| 9 | 13 | 25 | 21 | 41 | 35 | 57 | 65 | 73 | 65 | 89 | 65 |
| 10 | 13 | 26 | 22 | 42 | 36 | 58 | 65 | 74 | 65 | 90 | 65 |
| 11 | 14 | 27 | 22 | 43 | 37 | 59 | 65 | 75 | 65 | 91 | 65 |
| 12 | 14 | 28 | 23 | 44 | 38 | 60 | 65 | 76 | 65 | 92 | 65 |
| 13 | 15 | 29 | 23 | 45 | 40 | 61 | 65 | 77 | 65 | 93 | 65 |
| 14 | 15 | 30 | 24 | 46 | 42 | 62 | 65 | 78 | 65 | 94 | 65 |
| 15 | 16 | 31 | 25 | 47 | 45 | 63 | 65 | 79 | 65 | 95 | 65 |

FIG. 6

|  |  | θ |
|---|---|---|
| before compensation | average of error | 0.63 |
|  | minimum of error | −8.35 |
|  | maximum of error | 7.42 |
| after compensation | average of error | −0.06 |
|  | minimum of error | −2.00 |
|  | maximum of error | 1.49 |

FIG. 8

TILT DERIVATION DEVICE AND METHOD

CROSS-REFERENCE TO RELATED APPLICATION

The present application claims priority from and the benefit under 35 U.S.C. § 119(a) of Japanese Patent Application No. 2017-019289 filed on Feb. 6, 2017, all of which are hereby incorporated by reference in their entirety.

BACKGROUND

Field of the Disclosure

The present disclosure relates to a tilt derivation device and a tilt derivation method.

Discussion of the Related Art

In recent years, a position detection device such as a touch panel has been widely used in which a sensor such as a touch pad for detecting a designated position on a display device such as a liquid crystal panel is combined with and installed on the display device.

Such an input to the position detection device may be performed using a pointed rod-shaped stylus pen, for example, when an accurate input to the position detection device is required. Currently, various sorts of stylus pens are used, and among them, an active capacitive coupling type stylus pen comes into wide use.

As shown in FIG. 11, an active electrostatic coupling type stylus pen 101 includes a plurality of electrodes, for example, a first electrode 101a and a second electrode 101b, and a drive power source for driving them. The first electrode 101a is provided at one end of the stylus pen 101 in a direction of an axis C, and the second electrode 101b is provided in a shape of a ring around the axis C, for example, so as to surround the axis C. A position pointed by the stylus pen 101 is detected by a sensor 100a on a position detection device 100 receiving signals transmitted by the first and second electrodes 101a and 101b which are driven by the drive power source through electrostatic coupling.

Japanese Patent Publication No. 2011-164801 (referred to herein as Patent document 1) discloses a supporter, a position detection device and a position detection method as described above.

A tilt of a pointer with respect to the position detection device may be required as an input depending on an application program operating on the position detection device using the above-described stylus pen, that is, the pointer and the position detection device. In such a case, generally, when a detection coordinate of the first electrode 101a is A and a detection coordinate of the second electrode 101b is B on the XY plane and a distance between the first electrode 101a and the second electrode 101b is L in the direction of the axis C of the pointer 101, then the tilt of the axis C is derived by calculation based on these values.

In the case of using the pointer 101 as shown in FIG. 11, the first electrode 101a is close to the position detection device 100, and the second electrode 101b is separated from the position detection device 100 by a height H. Therefore, a detection value of the second electrode 101b by the sensor 100a is relatively small as compared with the first electrode 101a.

In addition, as described above, since the second electrode 101b is formed in a ring shape around the axis C, for example, so as to surround the axis C and has a relatively large volume as compared with the first electrode 101a, a range which the sensor 100a detects as the second electrode 101b is relatively wide.

Namely, the sensor 100a detects a region where a small detection value is widely distributed as the position of the second electrode 101b. Thus, it is not easy for the position detection device 100 to accurately specify the detection coordinate B of the second electrode 101b, which is the basis for calculation of the tilt as described above, from theses.

Since the second electrode 101b is provided in the ring shape around the axis C, for example, so as to surround the axis C, a shape of the region detected by the position detection device 100 as the position of the second electrode 101b changes according to the tilt of the pointer 101 and does not have a certain shape. It is not easy to specify the coordinate B based on the shape of the region corresponding to the second electrode 101b, for example, as well.

Moreover, the second electrode 101b is provided at a position with a certain distance from the axis C, and thus a value of the distance L between the electrodes 101a and 101b to be considered at the time of calculation according to the tilt of the pointer 101 is also strictly different.

Furthermore, as described above, since the detection value of the second electrode 101b by the sensor 100a is small, when some noises intervene, the noises greatly influence, and it is more difficult to specify the coordinate B.

Because the above-mentioned factors are synergized and it is difficult to accurately specify the coordinate B, the value of the specified coordinate B tends to contain errors to a large extent. As a result, the tilt, which is purely derived by calculation based on the value of the specified coordinate B as described above, may not be very precise.

SUMMARY

Accordingly, the present disclosure is directed to a tilt derivation device and a tilt derivation method that substantially obviate one or more of the problems due to limitations and disadvantages of the related art.

An object to be addressed by the present disclosure is to provide a tilt derivation device and a tilt derivation method that can accurately derive the tilt of a pointer.

Additional features and advantages of the present disclosure will be set forth in the description which follows, and in part will be apparent from the description, or may be learned by practice of the present disclosure. The objectives and other advantages of the present disclosure will be realized and attained by the structure particularly pointed out in the written description and claims hereof as well as the appended drawings.

To achieve these and other advantages and in accordance with the purpose of the present disclosure, as embodied and broadly described herein, there is provided a tilt derivation device for deriving a tilt of a pen-shaped pointer including a first electrode provided at one end of an axis and a second electrode provided around the axis. The tilt derivation device comprises a sensor of a plane shape configured to detect a position of the first electrode and a position of the second electrode, and a control portion. The control portion includes a lookup table in which a correspondence relationship between a tentative value of a slope direction tilt and a compensation value is registered, wherein the slope direction tilt is a tilt of the axis toward a slope direction that the axis is inclined from a normal direction perpendicular to the sensor; a slope direction tilt calculation portion configured to calculate the tentative value based on the positions of the first and second electrodes and to input the tentative value into the lookup table; and a tilt derivation portion configured to derive the tilt from the compensation value outputted from the lookup table.

In another aspect, there is provided a tilt derivation method for deriving a position pointed by a pen-shaped pointer including a first electrode provided at one end of an axis and a second electrode provided around the axis. The tilt derivation method comprises detecting a position of the first electrode and a position of the second electrode by a sensor of a plane shape; calculating a tentative value of a slope direction tilt based on the positions of the first and second electrodes, and inputting the tentative value into a lookup table in which a correspondence relationship between the tentative value and a compensation value is registered, wherein the slope direction tilt is a tilt of the axis toward a slope direction that the axis is inclined from a normal direction perpendicular to the sensor; and deriving the tilt from the compensation value outputted from the lookup table.

It is to be understood that both the foregoing general description and the following detailed description are exemplary and explanatory and are intended to provide further explanation of the present disclosure as claimed.

BRIEF DESCRIPTION OF THE DRAWINGS

The accompanying drawings, which are included to provide a further understanding of the present disclosure and which are incorporated in and constitute a part of this specification, illustrate embodiments of the present disclosure and together with the description serve to explain the principles of the present disclosure. In the drawings:

FIG. 4 is an explanatory view of a centroid calculation portion of the tilt derivation device according to the embodiment of the present disclosure.

FIG. 6 is a view showing an example of a lookup table of the tilt derivation device according to the embodiment of the present disclosure.

FIG. 8 is an explanatory view of an experimental result according to the embodiment of the present disclosure.

DETAILED DESCRIPTION

Reference will now be made in detail to embodiments of the disclosure, examples of which are illustrated in the accompanying drawings.

A tilt derivation device according to one or more embodiments of the present disclosure is a tilt derivation device for deriving the tilt of a pen-shaped pointer, and the pointer includes a first electrode provided at one end of an axis and a second electrode provided around the axis. The tilt derivation device includes a sensor of a plane shape configured to detect a position of the first electrode and a position of the second electrode and a control portion including a lookup table, a slope direction tilt calculation portion, and a tilt derivation portion. In the lookup table, a correspondence relationship between a tentative value of a slope direction tilt and a compensation value is registered wherein the slope direction tilt is a tilt of the axis toward a slope direction that the axis is inclined from a direction perpendicular to the sensor. The slope direction tilt calculation portion calculates the tentative value based on the positions of the first and second electrodes and inputs the tentative value into the lookup table. The tilt derivation portion derives the tilt from the compensation value outputted from the lookup table.

Moreover, a tilt derivation method according to one or more embodiments of the present disclosure, as a tilt derivation method for deriving a position pointed by a pen-shaped pointer, detects a position of a first electrode provided at one position of an axis of the pointer and a position of a second electrode provided to surround the axis by a sensor of a plane shape, calculates a tentative value of a slope direction tilt, which is a tilt of the axis toward the slope direction that the axis is inclined from a direction perpendicular to the sensor, based on the positions of the first and second electrodes, inputs the tentative value into a lookup table in which a correspondence relationship between the tentative value and a compensation value is registered, and derives the tilt from the compensation value outputted from the lookup table.

Hereinafter, exemplary embodiments of the present disclosure will be described in detail with reference to the accompanying drawings. All the components of the tilt derivation device according to all embodiments of the present disclosure are operatively coupled and configured.

Figure 1:
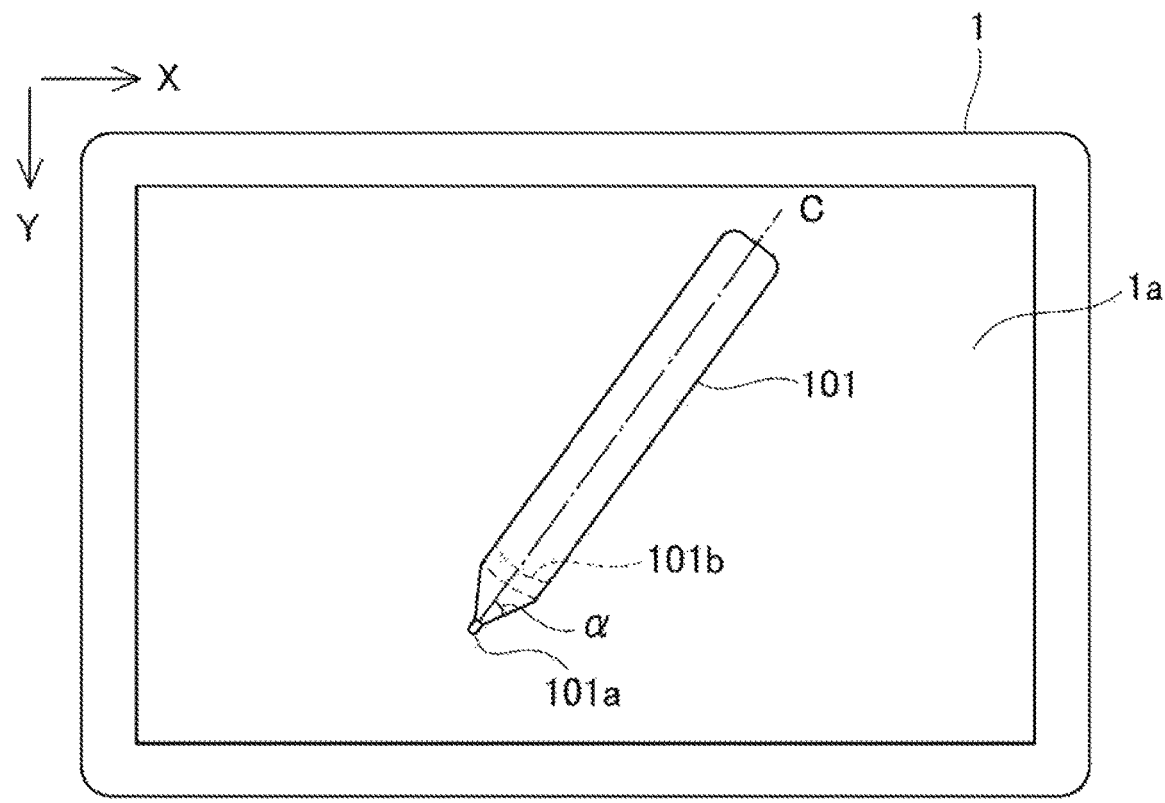
FIG. 1 is an explanatory view of a tilt derivation device according to an embodiment of the present disclosure and a pointer used together with the device.
Figure 2:
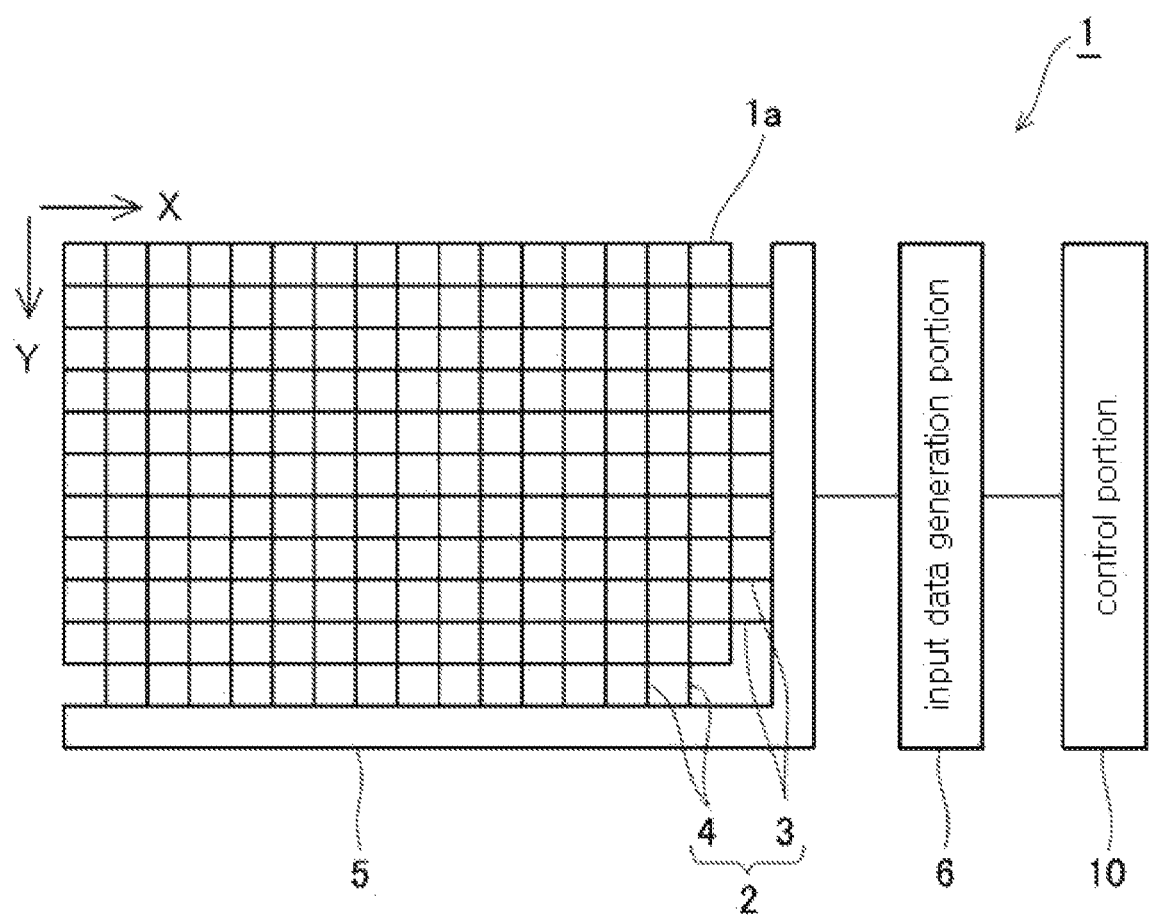
FIG. 2 is an explanatory view of the tilt derivation device according to the embodiment of the present disclosure.

FIG. 1 is an explanatory view of a tilt derivation device 1 according to an embodiment of the present disclosure and a pointer 101 used together with the device. FIG. 2 is an explanatory view of the tilt derivation device 1.

Referring to FIGS. 1 and 2, the pointer 101 has a pen shape and includes a first electrode 101a provided at one end in a direction of an axis C, a second electrode 101b provided around the axis C, and a drive power source for driving the first and second electrode 101a and 101b along with any other applicable components. The pointer 101 may be of a different shape.

In the present embodiment, the second electrode 101b is provided in a shape of a ring so as to surround the axis C.

The first and second electrodes 101a and 101b capacitively couple with a sensor 2 of the tilt derivation device 1 described later, thereby transmitting a signal to the tilt derivation device 1.

In this embodiment, the tilt derivation device 1 is a tablet type information terminal. For example, the tilt derivation device 1 may include the sensor 2 that has a plane shape and is a capacitive type sensor on a display device, such as a liquid crystal panel. The tilt derivation device 1 and/or the sensor 2 in all embodiments may be of different shapes. The sensor 2 is installed mostly over an entire surface of a display region of the liquid crystal panel, and all the display region is considered as a position detectable region 1a by the sensor 2. When the pointer 101 is located within the position detectable region 1a, the sensor 2 of the tilt derivation device 1 detects a position of the first electrode 101a and a position of the second electrode 101b and detects a position pointed by the pointer 101.

The sensor 2 includes a plurality of first direction conductors 3 extending in a first direction and a plurality of second direction conductors 4 extending in a second direction. In the present embodiment, the first direction may be a direction X that is a lateral direction on a ground, and the second direction may be a direction Y that is a longitudinal direction on a ground.

The first direction conductors 3 and the second direction conductors 4 are configured to have a sparse lattice shape as compared with pixels of the display device such that one first direction conductor 3 and one second direction conductor 4 correspond to the predetermined number of pixels of the display device.

The tilt derivation device 1 includes a selection circuit 5. An end of each first direction conductor 3 and an end of each second direction conductor 4 are connected to the selection circuit 5. The selection circuit 5 selects the first direction conductors 3 in a predetermined order and the second direction conductors 4 in a predetermined order and receives signals transmitted to the first and second direction conductors 3 and 4 from the first and second electrodes 101a and 101b.

The selection circuit 5 transmits the signals received from the first and second direction conductors 3 and 4 to an input data generation portion 6.

The tilt derivation device 1 includes the input data generation portion 6. The input data generation portion 6 classifies the signals from the selection circuit 5 into a signal from the first electrode 101a and a signal from the second electrode 101b, and transmits the signal from the first electrode 101a and the signal from the second electrode 101b to a control portion 10 as a first electrode data and a second electrode data, respectively.

This classification may be made, for example, by the sensor 2 and the selection circuit 5 receiving signals from the first electrodes 101a and receiving signals from the second electrodes 101b with a time division.

Figure 3:
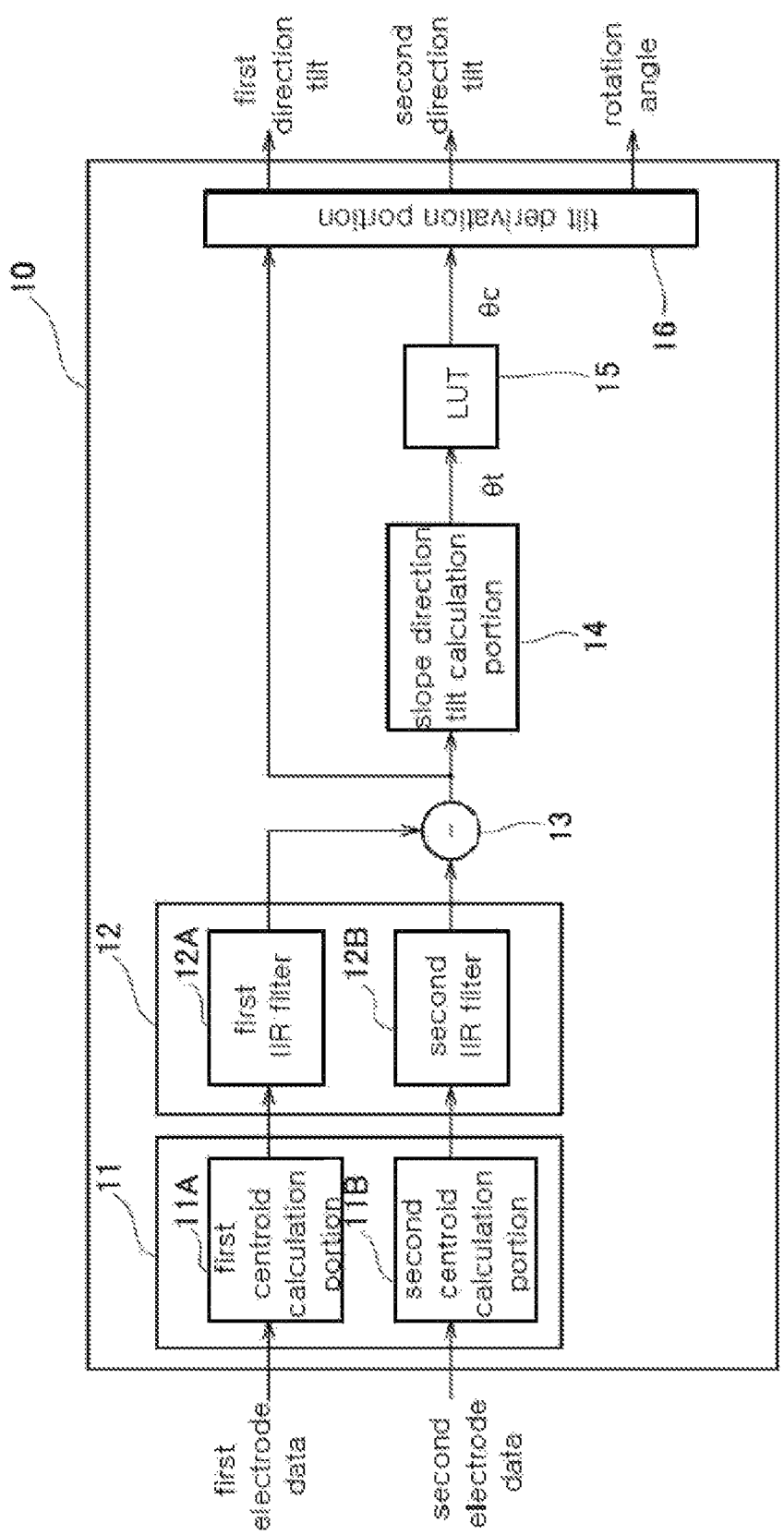
FIG. 3 is a signal processing block diagram of a control portion of the tilt derivation device according to the embodiment of the present disclosure.

The tilt derivation device 1 includes the control portion 10. FIG. 3 is a signal processing block diagram of one example of the control portion 10. Referring to FIG. 3, the control portion 10 includes a centroid calculation portion 11, an IIR filter 12, a subtractor 13, a slope direction tilt calculation portion 14, a lookup table (LUT) 15, and a tilt derivation portion 16.

The centroid calculation portion 11 includes a first centroid calculation portion 11A and a second centroid calculation portion 11B.

The first centroid calculation portion 11A receives the first electrode data from the input data generation portion 6, calculates a maximum value in each of the direction X and the direction Y, and thus specifies a coordinate on the sensor 2 at which the signal from the first electrode 101a of the pointer 101 is strongest, i.e., a response of the first electrode 101a is strongest.

Further, the first centroid calculation portion 11A extracts data of 25 coordinates on the sensor 2 in total with the coordinate, where the response of the first electrode 101a is strongest, as a center, and the 25 coordinates corresponds to five first direction conductors 3 and five second direction conductors 4. FIG. 4 explains 25 data D1 to D25 extracted above. In the example of FIG. 4, a data corresponding to the coordinate on the sensor where the response of the first electrode 101a is strongest is a data D13 at the center.

For the 25 data, as shown in the following formula 1, the first centroid calculation portion 11A adds up a data value (Di) and a coordinate value (xi, yi) on the sensor 2. Thus, the first centroid calculation portion 11A calculates a coordinate value on the sensor 2 with decimal places in each of the direction X and the direction Y, where the response of the first electrode 101a is strongest, converts this calculated result into an internal resolution value in each of the direction X and the direction Y used in an internal processing of the display device, and calculates a first electrode tentative coordinate value At(Axt, Ayt). In the formula 1, Nx and Ny are the number of the second direction conductors 4 and the number of the first direction conductors 3, respectively, and Px and Py are internal resolution values in the direction X and the direction Y of the display device, respectively.

Formula (1)

$$D_{sum} = \sum_{i=1}^{25} D_i$$

$$x_{sum} = \sum_{i=1}^{25} D_i \times x_i$$

$$y_{sum} = \sum_{i=1}^{25} D_i \times y_i$$

$$A_{xt} = \frac{x_{sum}}{D_{sum}} \times \frac{P_x}{N_x}$$

$$A_{yt} = \frac{y_{sum}}{D_{sum}} \times \frac{P_y}{N_y}$$

The first centroid calculation portion 11A transmits the first electrode tentative coordinate value At to the IIR filter 12.

The second centroid calculation portion 11B receives the second electrode data and calculates a maximum value in each of the direction X and the direction Y in the same way as the first centroid calculation portion 11A, and thus specifies a coordinate on the sensor 2 at which the signal from the second electrode 101b of the pointer 101 is strongest, i.e., a response of the second electrode 101b is strongest.

Further, in the same way as the first centroid calculation portion 11A, the second centroid calculation portion 11B extracts data of 25 coordinates on the sensor 2 in total with the coordinate, where the response of the second electrode 101b is strongest, as a center, and the 25 coordinates corresponds to five first direction conductors 3 and five second direction conductors 4.

For the 25 data, in the same way as the first centroid calculation portion 11A, the second centroid calculation portion 11B adds up a data value (Di) and a coordinate value (xi, yi) on the sensor 2. Thus, the second centroid calculation portion 11B calculates a coordinate value on the sensor 2 in each of the direction X and the direction Y, where the response of the second electrode 101b is strongest, converts this calculated result into an internal resolution value of the display device, and calculates a second electrode tentative coordinate value Bt(Bxt, Byt).

The second centroid calculation portion 11B transmits the second electrode tentative coordinate value Bt to the IIR filter 12.

The IIR filter 12 includes a first IIR filter 12A and a second IIR filter 12B.

The first IIR filter 12A receives the first electrode tentative coordinate value At from the first centroid calculation portion 11A, applies an IIR filter of a time direction to reduce a temporal sway, and calculates a first electrode coordinate value A(Ax, Ay).

The first IIR filter 12A transmits the first electrode coordinate value A to the subtractor 13.

The second IIR filter 12B receives the second electrode tentative coordinate value Bt from the second centroid calculation portion 11B, applies an IIR filter of a time direction to reduce a temporal sway, and calculates a second electrode coordinate value B(Bx, By).

The second IIR filter 12B transmits the second electrode coordinate value B to the subtractor 13.

The subtractor 13 receives the first electrode coordinate value A and the second electrode coordinate value B from the first IIR filter 12A and the second IIR filter 12B, respectively.

The subtractor 13 obtains a difference between the coordinate values A and B, in more detail, calculates (Bx−Ax) and (By−Ay), and thus produces a first direction difference Sx and a second direction difference Sy.

The subtractor 13 transmits the first direction difference Sx and the second direction difference Sy to the slope direction tilt calculation portion 14, and at the same time, transmits the first direction difference Sx and the second direction difference Sy to the tilt derivation portion 16.

The slope direction tilt calculation portion 14 calculates tentative values of a slope direction tilt based on the respective positions A and B of the first and second electrodes, more specifically, based on the first and second direction differences Sx and Sy calculated by the subtractor 13 in accordance with the positions A and B, and inputs the values to the LUT 15.

The slope direction tilt calculation portion 14 divides the differences Sx and Sy by a predetermined number, calculates values based on quotients, and in this embodiment, absolute values of the quotients, and inputs these values to the LUT 15.

Figure 5:
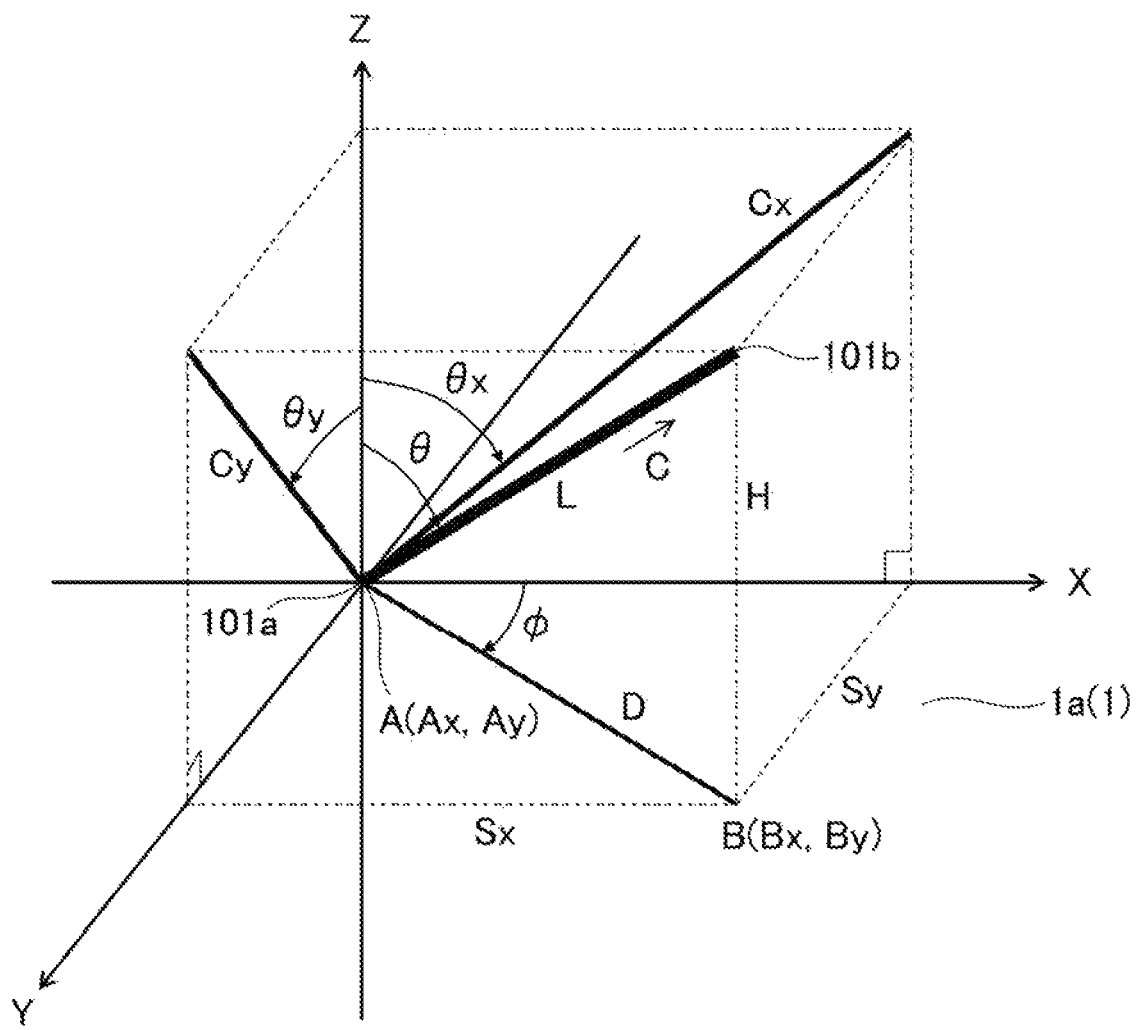
FIG. 5 is an explanatory view of a coordinate system in accordance with the tilt derivation device according to the embodiment of the present disclosure.

FIG. 5 shows a relationship between the first and second electrodes 101a and 101b of the pointer 101 and the tilt derivation device 1 as a coordinate system. The XY plane of FIG. 5 corresponds to the position detectable region 1a of the tilt derivation device 1.

The slope direction is a direction that the axis C is inclined from a direction perpendicular to the sensor 2. In FIG. 5, the inclination θ of the axis C toward the slope direction is shown as the slope direction tilt θ.

When a distance between the first electrode 101a and the second electrode 101b in the direction of the axis C of the pointer 101 is L, the slope direction tilt calculation portion 14 calculates a distance D between the first electrode coordinate value A and the second electrode coordinate value B in the XY plane and calculates a tentative value θt of the slope direction tilt θ of the axis C based on the distance D.

Formula (2)

$$D = \sqrt{S_x^2 + S_y^2}$$
$$\theta_t = \arcsin\frac{D}{L}$$
(2)

The slope direction tilt calculation portion 14 transmits the calculated tentative value θt of the slope direction tilt θ to the LUT 15.

In the LUT 15, a correspondence relationship of between the tentative value θt of the slope direction tilt θ and a compensation value is registered. In the present embodiment, the compensation value is a compensation value θc of the slope direction tilt θ.

Figure 11:
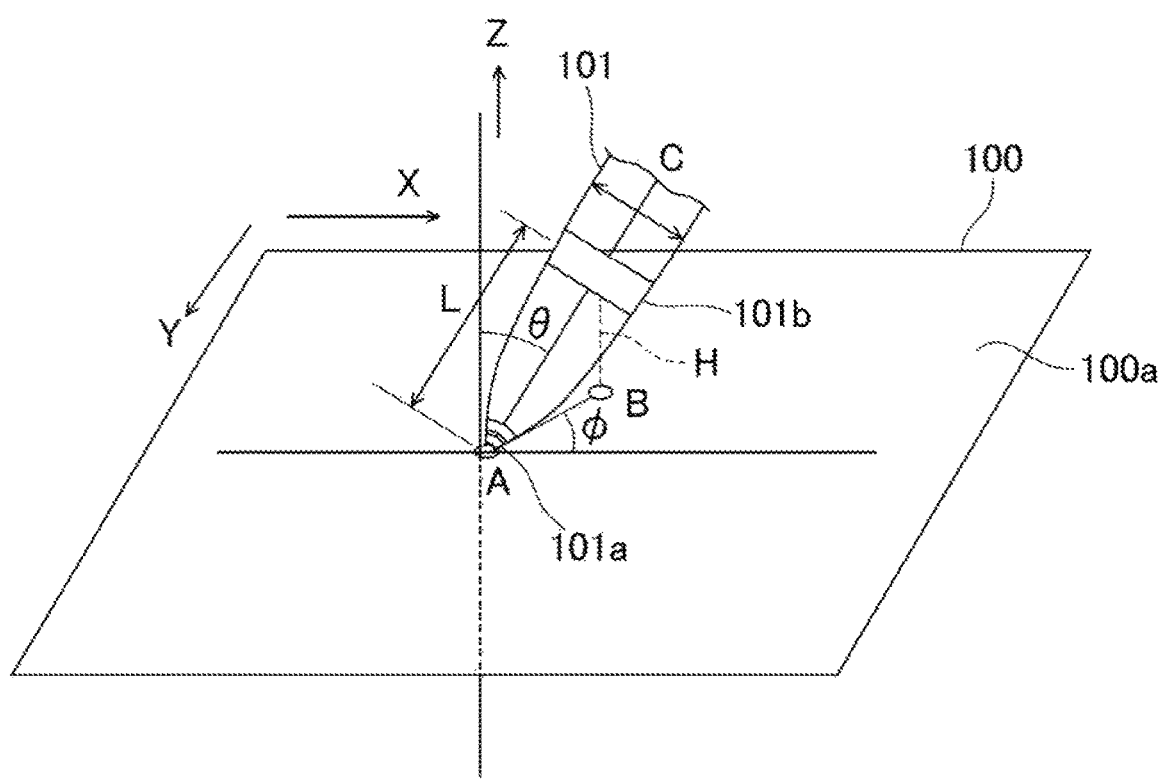
FIG. 11 is an explanatory view of a tilt derivation device and a pointer according to the related art.

In the pointer 101, when the first electrode 101a is installed to be close by the sensor 2, a detection value of the second electrode 101b by the sensor 2 is relatively small because the second electrode 101b is separated from the sensor 2 (e.g., similar to what is shown in FIG. 11). In addition, since the second electrode 101b has a relatively large volume around the axis C as compared with the first electrode 101a, a range which the sensor 2 detects as the second electrode is relatively wide. As such, the sensor 2 detects a region, where a small detection value is widely distributed, as the position of the second electrode 101b, and thus it is not easy to precisely specify the detection coordinate B of the second electrode 101b. Therefore, the second electrode coordinate value B outputted from the second IIR filter 12B quite includes errors. Accordingly, in the case of deriving the slope direction tilt θ from the above formula 2, the errors are reflected in the derived slope direction tilt θ.

Here, if a relationship between an angle at which the pointer 101 actually inclined and calculation values including errors of the second electrode coordinate value B and the slope direction tilt θ are known beforehand, the high-precision inclination can be derived from the calculation values including the errors. That is, for example, in an experiment or the like, an angle is measured by actually inclining the pointer 101, and the tentative value θt of the slope direction tilt θ at the time of the measurement is obtained as an output value including errors by an tilt derivation device, which is set to output the tentative value θt of the slope direction tilt θ from the slope direction tilt calculation portion 14 to the outside. The actual tilt of the pointer 101, as the compensation value θc of the tilt, is made to correspond to the output value θt, and this is contained as a correspondence relationship. When actually measuring the tilt, the tentative value θt of the slope direction tilt θ including the errors is calculated from the formula 2 by the slope direction tilt calculation portion 14, and then the compensation value θc of a corresponding tilt is derived from the correspondence relationship based on the output value θt, thereby obtaining the high-precision inclination of the pointer 101. In the LUT 15, such a correspondence relationship is registered.

FIG. 6 shows an example of the LUT 15. Referring to FIG. 6, in odd-numbered columns from the left of the table, the tentative values θt of the slope direction tilt θ including the errors, which are calculated by the slope direction tilt calculation portion 14, are shown as 'address,' and on the right side thereof, that is, in even-numbered columns, the compensation values θc respectively corresponding to the tentative values θt of the slope direction tilt θ are shown as 'data.'

For example, a value '33' is shown as the 'data' at a position where the 'address' is '40.' This means that the compensation value θc is 33 when the tentative value θt of the slope direction tilt θ calculated by the slope direction tilt calculation portion 14 is 40. Namely, at the time of the experiment, when the tentative value θt of the slope direction tilt θ calculated by the slope direction tilt calculation portion 14 is 40, it means that the pointer 101 is inclined so that the slope direction tilt becomes 33.

In this embodiment, the slope direction tilt θ is realized by 7 bits, for example, and the slope direction tilt θ can theoretically have a value up to 127. Therefore, FIG. 6 shows only a part of the LUT 15.

As shown in FIG. 1, in the present embodiment, the pointer 101 is formed with a taper shape such that a diameter thereof gradually increases from a front end, where the first electrode 101a is located, toward the direction of the axis C. When the portion of the taper shape has an angle α of 25 degrees, for example, with respect to the axis C, in a state that the first electrode 101a contacts the position detectable region 1a of the tilt derivation device 1, it is not possible to incline the pointer 101 over 25 degrees. In this case, an upper limit of the compensation value θc is 65 degrees. In other words, in this embodiment, a value over the upper limit value, 65 degrees, is not registered in the LUT 15.

According to the correspondence relationship shown in the example of FIG. 6, the LUT 15 extracts the compensation value θc of the slope direction tilt θ based on the tentative value θt of the slope direction tilt θ, which is received from the slope direction tilt calculation portion 14, and transmits the compensation value θc to the tilt derivation portion 16, which will be explained hereinafter.

The tilt derivation portion 16 receives the first direction difference Sx and the second direction difference Sy from the subtractor 13 and receives the compensation value θc of the slope direction tilt θ from the LUT 15.

The tilt derivation portion 16 derives the tilt from the compensation value θc of the slope direction tilt θ outputted from the LUT 15.

More particularly, the tilt derivation portion 16 derives a first direction tilt, which is the tilt of the axis C from a normal direction Z perpendicular to the sensor 2 toward the first direction on the sensor 2, and a second direction tilt, which is the tilt of the axis C from the normal direction Z toward the second direction perpendicular to the first direction on the sensor 2, based on the compensation value θc of the slope direction tilt θ outputted from the LUT 15.

In the present embodiment as described above, the first direction is the direction X shown in FIG. 5, and thus the first direction tilt, which is the tilt of the axis C from the normal direction Z toward the first direction X on the sensor 2, corresponds to an angle θx on the XZ plane in FIG. 5. In other words, the first direction tilt θx is a tilt of the axis Cx, which is a component of the axis C projected onto the XZ plane, from the normal direction Z.

Moreover, in the same way, the second direction is the direction Y shown in FIG. 5, and thus the second direction tilt, which is the tilt of the axis C from the normal direction Z toward the second direction Y on the sensor 2, corresponds to an angle θy on the YZ plane in FIG. 5. In other words, the second direction tilt θy is a tilt of the axis Cy, which is a component of the axis C projected onto the YZ plane, from the normal direction Z.

The tilt derivation portion 16 calculates a height H of the second electrode 101b from the position detectable region 1a from the compensation value θc of the slope direction tilt θ according to the following formula 3 and then derives the first direction tilt θx and the second direction tilt θy according to the formula 4.

Formula (3)

$$H = L\cos\theta_c \quad (3)$$

Formula (4)

$$\theta_x = \arctan\frac{S_x}{H} \quad (4)$$

$$\theta_y = \arctan\frac{S_y}{H}$$

In addition, the tilt derivation portion 16 derives a rotation angle of the axis C on the sensor 2 from a predetermined direction on the sensor 2.

In this embodiment, the predetermined direction is the first direction X, the rotation angle corresponds to an angle φ from the first direction X toward the second direction Y on the XY plane, i.e., the position detectable region 1a.

The tilt derivation portion 16 derives the rotation angle φ according to the following formula 5.

Formula (5)

$$\phi = \arctan\frac{S_y}{S_x} \quad (5)$$

Next, a tilt derivation method using the tilt derivation device 1 will be described with reference to FIGS. 1 to 6.

When the pointer 101 is located such that the first electrode 101a contacts the position detectable region 1a of the tilt derivation device 1, the tilt derivation device 1 detects the positions of the first electrode 101a and the second electrode 101b using the sensor 2.

More specifically, the selection circuit 5 receives the signals transmitted from the pointer 101 to the sensor 2 through the first direction conductors 3 and the second direction conductors 4.

The selection circuit 5 transmits the signals received from the first and second conductors 3 and 4 to the input data generation portion 6.

The input data generation portion 6 classifies the signals from the selection circuit 5 into the signal from the first electrode 101a and the signal from the second electrode 101b, and transmits the signal from the first electrode 101a as the first electrode data and the signal from the second electrode 101b as the second electrode data to the control portion 10.

The first centroid calculation portion 11A of the control portion 10 receives the first electrode data from the input data generation portion 6, specifies a coordinate where the signal from the first electrode 101a of the pointer 101 is strongest, i.e., a response of the first electrode 101a is strongest, and calculates the first electrode tentative coordinate value At(Axt, Ayt) from the coordinate on the sensor 2 where the response of the first electrode 101a is strongest.

The first centroid calculation portion 11A transmits the first electrode tentative coordinate value At to the IIR filter 12.

In the same way as the first centroid calculation portion 11A, the second centroid calculation portion 11B receives the second electrode data, calculates the second electrode tentative coordinate value Bt(Bxt, Byt), and transmits the second electrode tentative coordinate value Bt to the IIR filter 12.

The first IIR filter 12A receives the first electrode tentative coordinate value At from the first centroid calculation portion 11A, applies an IIR filter of a time direction, calculates the first electrode coordinate value A(Ax, Ay), and transmits the first electrode coordinate value A to the subtractor 13.

The second IIR filter 12B receives the second electrode tentative coordinate value Bt from the second centroid calculation portion 11B, applies an IIR filter of a time direction, calculates the second electrode coordinate value B(Bx, By), and transmits the second electrode coordinate value B to the subtractor 13.

The subtractor 13 receives the first electrode coordinate value A and the second electrode coordinate value B from the first IIR filter 12A and the second IIR filter 12B, respectively.

The subtractor 13 calculates the first direction difference Sx and the second direction difference Sy, and the subtractor 13 transmits the differences Sx and Sy to the slope direction tilt calculation portion 14 and, at the same time, transmits the differences Sx and Sy to the tilt derivation portion 16.

The slope direction tilt calculation portion 14 calculates the tentative values θt of the slope direction tilt θ according to the above formula 2 based on the positions A and B of the first and second electrodes, more specifically, based on the first and second direction differences Sx and Sy calculated by the subtractor 13 in accordance with the positions A and B.

The slope direction tilt calculation portion 14 transmits the calculated tentative values θt of the slope direction tilt θ to the LUT 15.

According to the correspondence relationship shown in FIG. 6, the LUT 15 extracts the compensation value θc of the slope direction tilt θ based on the tentative value θt of the slope direction tilt θ, which is received from the slope direction tilt calculation portion 14, and transmits the compensation value θc to the tilt derivation portion 16.

The tilt derivation portion 16 derives the tilt from the compensation value θc of the slope direction tilt θ outputted from the LUT 15.

More particularly, the tilt derivation portion 16 derives the first direction tilt θx and the second direction tilt θy according to the formula 3 and the formula 4 based on the compensation value θc of the slope direction tilt θ outputted from the LUT 15.

In addition, the tilt derivation portion 16 derives the rotation angle φ of the axis C according to the formula 5.

Next, the advantages of the tilt derivation device 1 and the inclination derivation method according to the embodiments of the present disclosure are explained.

According to the above configuration, in the LUT 15, a correspondence relationship between the tentative values θt of the slope direction tilt θ including the errors, which are calculated by the slope direction tilt calculation portion 14, and the compensation values θc thereof is registered.

More specifically, in this embodiment, for example, through an experiment or the like, the pointer 101 is actually inclined and an angle is measured by the tilt derivation device, which is set to output the tentative value θt of the slope direction tilt θ from the slope direction tilt calculation portion 14 to the outside. At that time, the tentative value θt of the slope direction tilt θ is obtained as the output value including the errors, and the correspondence relationship between the actual tilt of the pointer 101 as the compensation value θc and the output value θt is contained in the LUT 15. That is, the correspondence relationship in the LUT 15 is generated by making the tilt value of actually inclining the pointer 101 and the output value of the slope direction tilt calculation portion 14 correspond to the compensation value θc and the tentative value θt, respectively.

Accordingly, even though the second electrode coordinate B outputted from the second IIR filter 12B and the tentative value θt of the slope direction tilt θ calculated on the basis of the second electrode coordinate value B in the slope direction tilt calculation portion 14 quite have errors by factors such as a minute detection value due to the second electrode 101b separated from the sensor and a wide detection range due to a shape of the second electrode 101b, the compensation value θc solved in correspondence with the errors is contained in the LUT 15, and the compensation value θc is used as the slope direction tilt to derive the tilt in the tilt derivation portion 16, thereby increasing a precision of the tilt outputted by the tilt derivation portion 16.

Furthermore, in the present embodiment, the LUT 15, which registers and contains the correspondence relationship between the tentative value θt of the slope direction tilt θ and the compensation value θc, can be realized in a one-dimensional arrangement as shown in FIG. 6. Accordingly, a small amount of memory is needed for mounting the LUT 15, and it can be easily applied to hardware having a low memory capacity.

<Experimental Result>

An experimental result according to the above embodiment will be described with reference to FIGS. 7 and 8.

Figure 7:
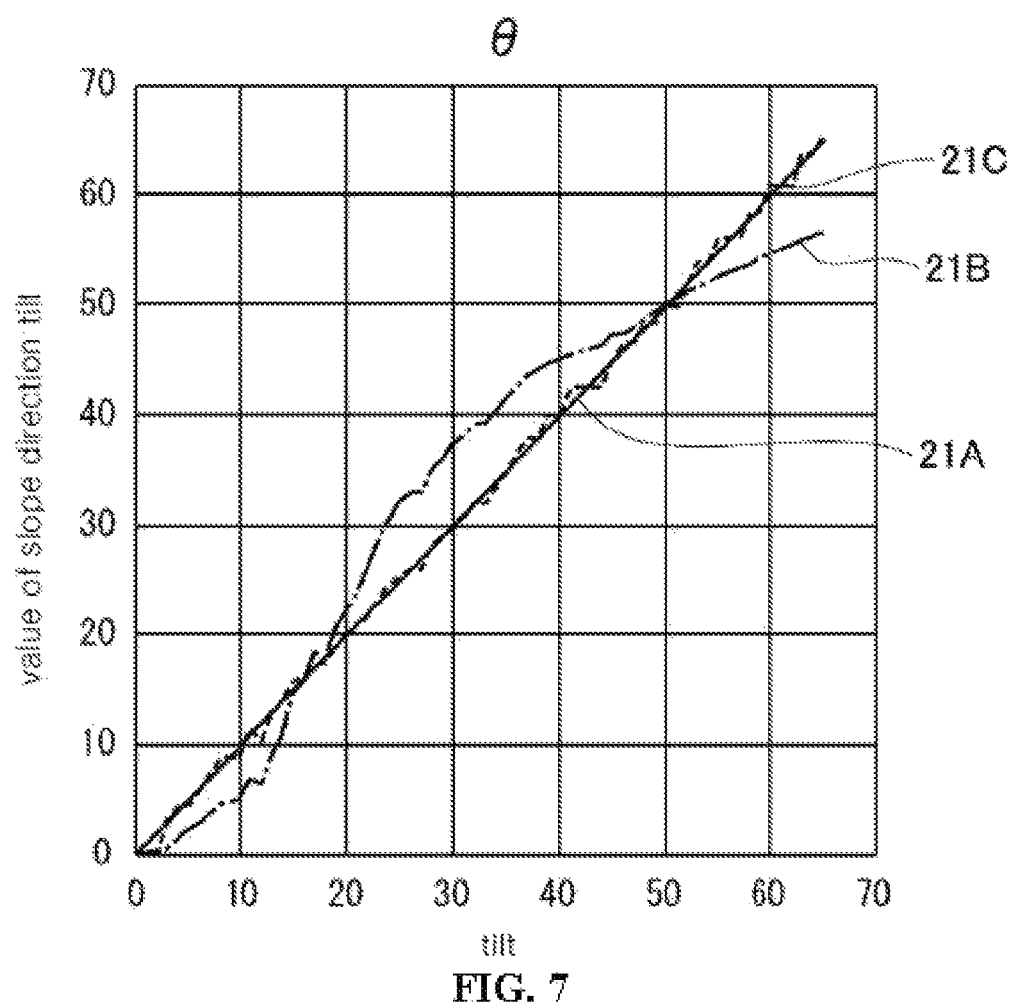
FIG. 7 is an explanatory view of an experimental result according to the embodiment of the present disclosure.

FIG. 7 is a graph showing a derivation result of the slope direction tilt. In this experiment, the slope direction tilt is measured with the rotation angle φ of 0 degree. In FIG. 7, a lateral axis indicates an angle at which the pointer is actually inclined with respect to the position detectable region 1a of the tilt derivation device 1, and a longitudinal axis indicates a value of the slope direction tilt in the tilt derivation device 1.

In FIG. 7, a line 21A is an ideal value, a line 21B is the tentative value θt of the slope direction tilt derived according to calculation of the formula 2, and a line 21C is the compensation value θc obtained as a result of compensating the tentative value θt of the slope direction tilt through the LUT 15. The line 21B deviates from the line 21A, and a large error is noticed. However, the line 21C mostly follows the line 21A, and an error is reduced as compared with the line 21B.

FIG. 8 shows a table of the experimental result of FIG. 7. In the tentative value θt of the slope direction tilt, which corresponds to the line 21B before compensation and is derived according to the calculation of the formula 2, a wide range of error, −8.35 to 7.42 degrees, was observed. However, in the compensation value θc, which corresponds to the line 21C and is compensated through the LUT 15, a relatively very narrow range of error, −2.0 to 1.49 degrees, was observed.

First Alternative Embodiment

Figure 9:
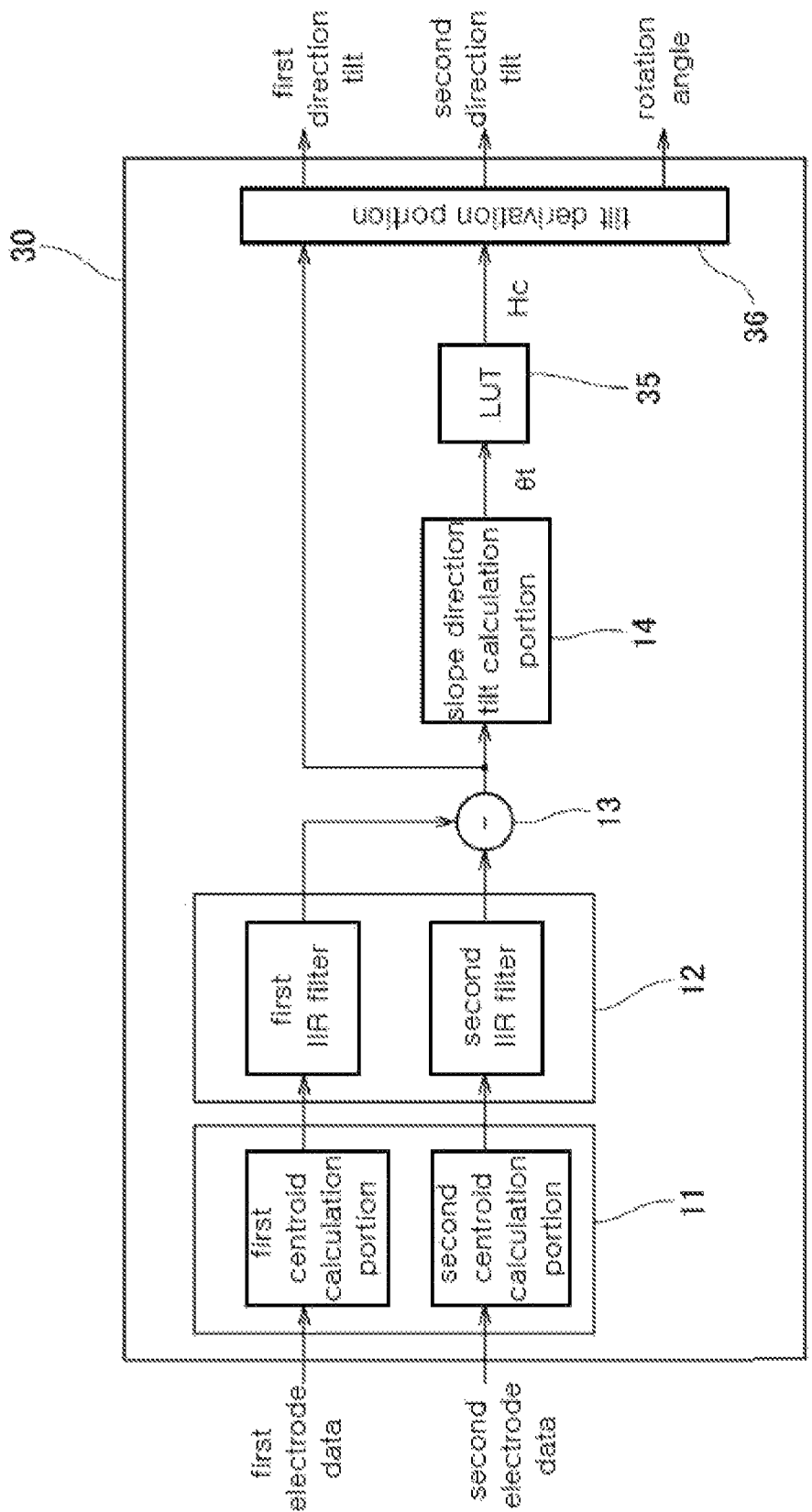
FIG. 9 is a signal processing block diagram of a control portion according to a first alternative embodiment of the present disclosure.

A first alternative embodiment or modified embodiment to the above tilt derivation device 1 and the tilt derivation method will be described hereinafter. FIG. 9 is a signal processing block diagram of a control portion 30 of a tilt derivation device according to the first alternative embodiment of the present disclosure. Referring to FIG. 9, the control portion 30 of the tilt derivation device according to the first alternative embodiment is different from the control portion 10 of the above embodiment in that a correspondence relationship between the tentative value θt of the slope direction tilt θ and a compensation value Hc of the height H of the second electrode 101b from the position detectable region 1a is registered in an LUT 35 of the control portion 30 while the correspondence relationship between the tentative value θt of the slope direction tilt θ and the compensation value θc of the slope direction tilt θ is registered in the LUT 15 of the control portion 10. That is, in the LUT 35 of the first alternative embodiment, the compensation value is the compensation value Hc of the height H of the second electrode 101b with respect to the sensor 2.

In the same way as the above embodiment, the slope direction tilt calculation portion 14 calculates the tentative values θt of the slope direction tilt based on the positions A and B of the first and second electrodes, more specifically, based on the first and second direction differences Sx and Sy calculated by the subtractor 13 in accordance with the positions A and B, and inputs the tentative values θt to the LUT 35.

The correspondence relationship between the tentative value θt of the slope direction tilt θ and the compensation value Hc of the height H of the second electrode 101b from the position detectable region 1a shown in FIG. 5 is registered in the LUT 35.

For example, through an experiment or the like, the pointer 101 is actually inclined and the height H of the second electrode 101b is measured by the tilt derivation device, which is set to output the tentative value θt of the slope direction tilt θ from the slope direction tilt calculation portion 14 to the outside, and at that time, the tentative value θt of the slope direction tilt θ is obtained as the output value including the errors. The actual height of the second electrode 101b, as the compensation value Hc of the height H, is made to correspond to the output value θt, and this is contained as the correspondence relationship. When the tilt is actually measured, the tentative value θt of the slope direction tilt θ including the errors is calculated by the slope direction tilt calculation portion 14 according the formula 2, and then the compensation value Hc of the height H of the second electrode 101b corresponding to this is derived from the correspondence relationship based on the output value θt, thereby obtaining a high-precision height of the second electrode 101b. In the LUT 35, such a correspondence relationship is registered.

In other words, the correspondence relationship in the LUT 35 is generated by making the height of the second electrode 101b when the pointer 101 is actually inclined and the output value of the slope direction tilt calculation portion 14 correspond to the compensation value Hc and the tentative value θt, respectively.

According to the correspondence relationship, the LUT 35 extracts the compensation value Hc of the height H of the second electrode 101b based on the tentative value θt of the slope direction tilt θ received from the slope direction tilt calculation portion 14 and transmits the compensation value Hc to a tilt derivation portion 36, which will be explained hereinafter.

The tilt derivation portion 36 receives the first direction difference Sx and the second direction difference Sy from the subtractor 13 and receives the compensation value Hc of the height H of the second electrode 101b from the LUT 35.

The tilt derivation portion 36 derives the tilt from the compensation value Hc of the height H of the second electrode 101b outputted from the LUT 35.

More particularly, the tilt derivation portion 36 derives a first direction tilt θx and a second direction tilt θy according to the following formula 6 based on the compensation value Hc of the height H of the second electrode 101b outputted from the LUT 35.

Formula (6)

$$\theta_x = \arctan \frac{S_x}{Hc}$$
$$\theta_y = \arctan \frac{S_y}{Hc}$$
(6)

In addition, the tilt derivation portion 36 derives the rotation angle φ of the axis C according to the above formula 5.

The tilt derivation device and method according to the first alternative embodiment have substantially the same advantages as the above embodiment.

Particularly, in the first alternative embodiment, when the control portion 30 does not need to output the value of the slope direction tilt θ, since the tilt can be derived according to the formula 6 with the high-precision compensation value Hc of the height H of the second electrode 101b outputted from the LUT 35, it is not necessary to calculate the height H of the second electrode 101 according to the formula 3. Thus, it is possible to simplify the circuit configuration and improve the processing speed.

Second Alternative Embodiment

Figure 10:
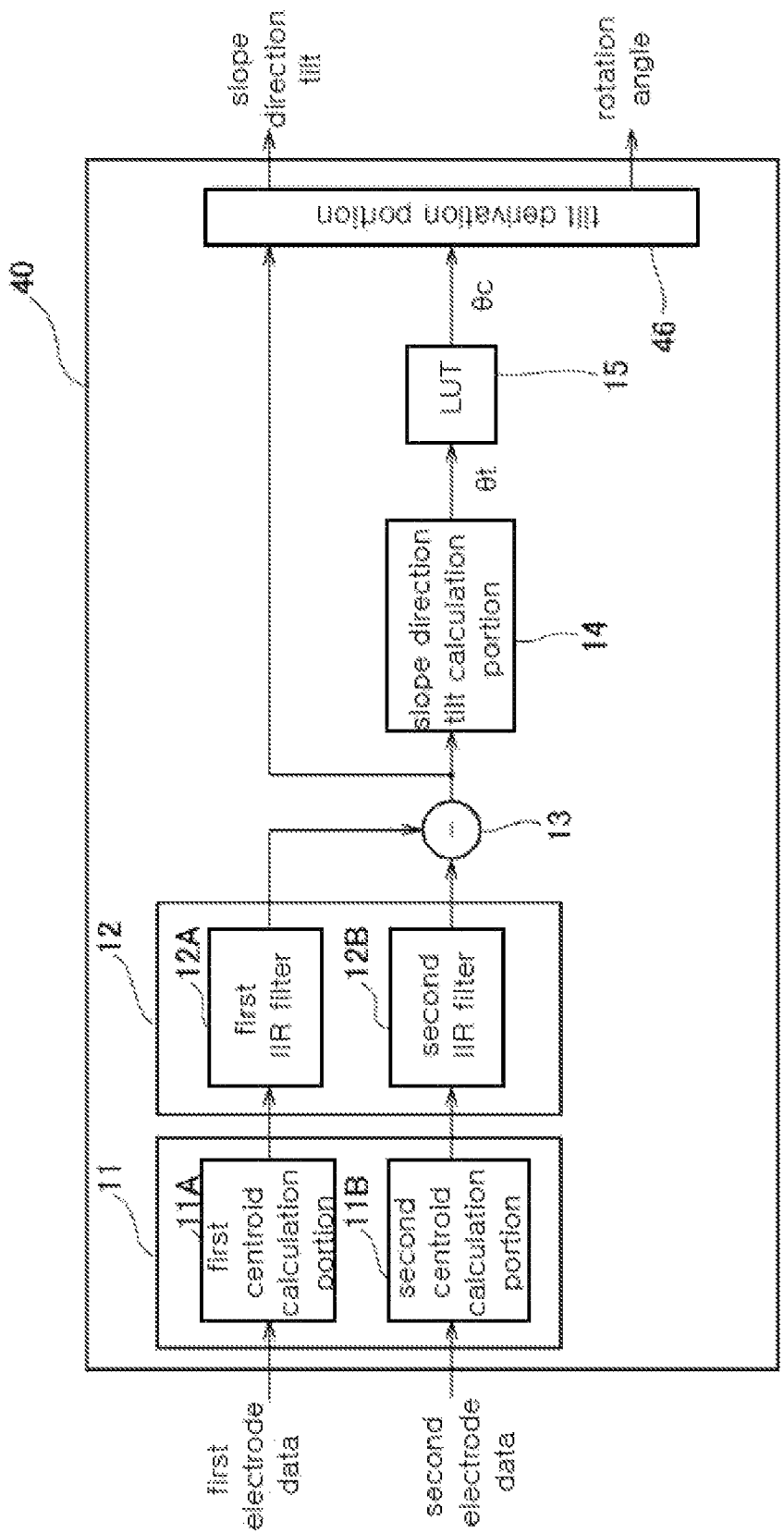
FIG. 10 is a signal processing block diagram of a control portion according to a second alternative embodiment of the present disclosure.

A second alternative embodiment or modified embodiment to the above tilt derivation device 1 and the tilt derivation method will be described hereinafter. FIG. 10 is a signal processing block diagram of a control portion 40 of a tilt derivation device according to the second alternative embodiment of the present disclosure. Referring to FIG. 10, the control portion 40 of the tilt derivation device according to the second alternative embodiment is different from the control portion 10 of the tilt derivation device 1 of the above embodiment in that a tilt derivation portion 46 of the control portion 40 outputs a slope direction tilt instead of the first direction tilt θx and the second direction tilt θy.

In the same way as the above embodiment, the slope direction tilt calculation portion 14 calculates the tentative values θt of the slope direction tilt based on the positions A and B of the first and second electrodes, more specifically, based on the first and second direction differences Sx and Sy calculated by the subtractor 13 in accordance with the positions A and B, and inputs the tentative values θt to the LUT 15.

According to the correspondence relationship as shown in FIG. 6, the LUT 15 extracts the compensation value θc of the slope direction tilt θ based on the tentative value θt of the slope direction tilt θ, which is received from the slope direction tilt calculation portion 14, and transmits the compensation value θc to the tilt derivation portion 46, which will be explained hereinafter.

The tilt derivation portion 46 outputs the correction value θc of the slope direction tilt θ received from the LUT 15 as the slope direction tilt.

In addition, the tilt derivation portion 46 derives and outputs the rotation angle φ of the axis C according to the formula 5.

The tilt derivation device and method according to the second alternative embodiment have substantially the same advantages as the above embodiment.

Further, the tilt derivation device and method of the present disclosure are not limited to the above embodiments described with reference to the drawings, and various other modifications can be made in the technical scope thereof.

For example, in the above-described embodiments, the tilt derivation device is a tablet type information terminal, but the present disclosure is not limited to this. Alternatively, the tilt derivation device according to all embodiments may be other type devices having a display device and a sensor, such as a smart phone, a stationary type display or the like.

Additionally, in the above-described embodiments, the second electrode 101b of the pointer 101 is installed with a ring shape surrounding the axis C. Alternatively, a plurality of second electrodes having the same function may be installed with a ring or other shape while the second electrodes are spaced apart from each other along a circumferential direction with the axis C as a center.

According to the tilt derivation device and method of the present disclosure, it is possible to precisely derive the tilt of the pointer.

It will be apparent to those skilled in the art that various modifications and variations can be made in a display device of the present disclosure without departing from the sprit or scope of the embodiments. Thus, it is intended that the present disclosure covers the modifications and variations of this invention provided they come within the scope of the appended claims and their equivalents.

What is claimed is:

1. A tilt derivation device for deriving a tilt of a pen-shaped pointer, the pointer including a first electrode provided at one end of an axis and a second electrode provided around the axis, the tilt derivation device comprising:
   a sensor of a plane shape configured to detect a position of the first electrode and a position of the second electrode; and
   a control portion,
   wherein the control portion includes:
      a lookup table in which a correspondence relationship between a tentative value of a slope direction tilt angle and a compensation value is registered, wherein the slope direction tilt angle is a tilt of the axis toward a slope direction that the axis is inclined from a normal direction perpendicular to the sensor,
      a slope direction tilt calculation portion configured to calculate the tentative value based on the positions of the first and second electrodes and to input the tentative value into the lookup table, and
      a tilt derivation portion configured to derive a compensated tilt angle value from the compensation value outputted from the lookup table.

2. The tilt derivation device of claim 1, wherein the compensation value is a compensation angle value for the slope direction tilt angle.

3. The tilt derivation device of claim 1, wherein the compensation value is a height compensation value for a height of the second electrode with respect to the sensor.

4. The tilt derivation device of claim 1, wherein the tilt derivation portion derives a first direction tilt and a second direction tilt based on the compensation value outputted from the lookup table, wherein the first direction tilt is a tilt of the axis from the normal direction perpendicular to the sensor toward a first direction on the sensor, and the second direction tilt is a tilt of the axis from the normal direction toward a second direction perpendicular to the first direction on the sensor.

5. The tilt derivation device of claim 4, wherein the tilt derivation portion derives a rotation angle of the axis on the sensor from a predetermined direction on the sensor.

6. The tilt derivation device of claim 2, wherein the tilt derivation portion outputs the compensation value of the slope direction tilt angle as the slope direction tilt angle.

7. The tilt derivation device of claim 6, wherein the tilt derivation portion derives a rotation angle of the axis on the sensor from a predetermined direction on the sensor.

8. A tilt derivation method for deriving a position pointed by a pen-shaped pointer, the pointer including a first electrode provided at one end of an axis and a second electrode provided around the axis, the tilt derivation method comprising:
   detecting a position of the first electrode and a position of the second electrode by a sensor of a plane shape;
   calculating a tentative value of a slope direction tilt angle based on the positions of the first and second electrodes, and inputting the tentative value into a lookup table in which a correspondence relationship between the tentative value and a compensation value is registered, wherein the slope direction tilt angle is a tilt of the axis toward a slope direction that the axis is inclined from a normal direction perpendicular to the sensor; and
   deriving a compensated tilt angle value from the compensation value outputted from the lookup table.

9. The tilt derivation method of claim 8, wherein the compensation value is a compensation angle value for the slope direction tilt angle.

10. The tilt derivation method of claim 8, wherein the compensation value is a height compensation value for a height of the second electrode with respect to the sensor.

11. The tilt derivation method of claim 8, wherein a first direction tilt and a second direction tilt are derived based on the compensation value outputted from the lookup table, wherein the first direction tilt is a tilt of the axis from the normal direction perpendicular to the sensor toward a first direction on the sensor, and the second direction tilt is a tilt of the axis from the normal direction toward a second direction perpendicular to the first direction on the sensor.

12. The tilt derivation method of claim 11, wherein a rotation angle of the axis on the sensor is derived from a predetermined direction on the sensor.

13. The tilt derivation method of claim 9, wherein the compensation angle value of the slope direction tilt angle is outputted as the slope direction tilt angle.

14. The tilt derivation method of claim 13, wherein a rotation angle of the axis on the sensor is derived from a predetermined direction on the sensor.

15. A tilt derivation device for deriving a tilt of a pen-shaped pointer, the pointer including a first electrode provided at one end of an axis and a second electrode provided around the axis, the tilt derivation device comprising:
   a sensor of a plane shape configured to detect a position of the first electrode and a position of the second electrode;
   a slope direction tilt calculator configured to calculate the tentative value based on the positions of the first and second electrodes and to input the tentative value into the lookup table;
   a lookup table storing correspondence relationships between tentative values of a slope direction tilt angle of the pen-shaped pointer and compensation values, wherein the slope direction tilt angle is a tilt of the axis toward a slope direction in which the axis is inclined from a normal direction perpendicular to the sensor, the lookup table being configured to receive the tentative value from the slope direction tilt calculator and output a compensation value corresponding to the tentative value input from the slope direction tilt calculator; and
   a tilt deriver configured to receive the compensation value from the lookup table and generate a compensated tilt angle value based on the compensation value output from the lookup table.

16. The tilt derivation device of claim 15, further comprising:
   a subtractor configured to generate a first direction difference value and a second direction difference value based on the positions of the first and second electrodes, and transmit the first and second direction difference values to the slope direction tilt calculator, wherein the slope direction tilt calculator generates the tentative value based on the first and second direction difference values.

17. The tilt derivation device of claim 16, wherein the subtractor is further configured to supply the first and second direction difference values to the slope direction tilt calculator and the tilt deriver at the same time.

18. The tilt derivation device of claim 16, wherein the tentative value is defined by the equation:

the tentative value $$(\theta t) = \arcsin \frac{\sqrt{Sx^2 + Sy^2}}{L};$$

wherein Sx is the first direction difference value, Sy is the second direction difference value and L is a distance between the first electrode and the second electrode.

19. The tilt derivation device of claim 15, further comprising:

a centroid calculator configured to receive a first electrode data and a second electrode data and calculate a first electrode tentative coordinate value and a second electrode tentative coordinate value; and an IIR filter configured to apply an IIR filter of a time direction to the first and second electrode tentative coordinate values to thereby reduce a temporal sway, and calculate a first electrode coordinate value and a second electrode coordinate value.

20. The tilt derivation device of claim 19, wherein the centroid calculator is configured to receive the first electrode data and the second electrode data and calculate a maximum value in each of a first direction and a second direction, thereby specifying a coordinate on the sensor at which a response of the first and second electrodes is strongest; to extract 25 coordinate data on the sensor with the specified coordinate as a center; to add up data values and coordinate values on the sensor for the 25 coordinate data, thereby calculating a coordinate value on the sensor in each of the first and second directions where the response of the first and second electrodes is strongest; and to convert a calculated result into an internal resolution value in each of the first and second directions, thereby calculating the first electrode tentative coordinate value and the second electrode tentative coordinate value.

* * * * *